(12) United States Patent
Yamada et al.

(10) Patent No.: US 10,021,359 B2
(45) Date of Patent: Jul. 10, 2018

(54) DISCHARGE LAMP LIGHTING DEVICE, LIGHT SOURCE DEVICE, AND IMAGE FORMATION DEVICE

(71) Applicant: USHIO DENKI KABUSHIKI KAISHA, Tokyo (JP)

(72) Inventors: Koji Yamada, Himeji (JP); Shigeyoshi Matsumoto, Himeji (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/329,338

(22) PCT Filed: Jul. 23, 2015

(86) PCT No.: PCT/JP2015/070977
§ 371 (c)(1),
(2) Date: Jan. 26, 2017

(87) PCT Pub. No.: WO2016/017524
PCT Pub. Date: Feb. 4, 2016

(65) Prior Publication Data
US 2017/0237954 A1    Aug. 17, 2017

(30) Foreign Application Priority Data
Jul. 29, 2014 (JP) .................................. 2014-153959

(51) Int. Cl.
*H04N 9/31* (2006.01)
*G03B 21/20* (2006.01)

(52) U.S. Cl.
CPC ....... *H04N 9/3155* (2013.01); *G03B 21/2026* (2013.01); *H04N 9/3179* (2013.01)

(58) Field of Classification Search
CPC ........ G03B 21/20; G03B 21/14; G03B 21/00; G09G 3/20; G09G 3/36; G09G 3/34; H04N 9/31; H05B 41/24
See application file for complete search history.

(56) References Cited

U.S. PATENT DOCUMENTS 5,608,294 A    3/1997  Derra et al.
2012/0154757 A1*  6/2012  Terashima ......... G03B 21/2026
                                                353/30

FOREIGN PATENT DOCUMENTS

JP    H10-501919 A    2/1998
JP    2009-198886 A   9/2009
JP    2009-288349 A   12/2009

OTHER PUBLICATIONS

Notification of Transmittal of Translation of the International Preliminary Report on Patentability and Translation of Written Opinion of the International Searching Authority; PCT/JP2015/010977; dated Feb. 9, 2017.

(Continued)

*Primary Examiner* — Sultan Chowdhury
*Assistant Examiner* — Danell L Owens
(74) *Attorney, Agent, or Firm* — Studebaker & Brackett PC

(57) ABSTRACT

The discharge lamp lighting device for supplying alternating current to a discharge lamp includes: a power supply control part having a segment signal generation part, a peak value control part, and a frequency control part; and a power supply part. The peak value control part sets a specific segment period, which indicates a value where a value of integral corresponding to a product of the length of the segment period and a peak value set in a segment period is most deviated from an average value of the values of integral within the specific period, to a period other than a final segment period positioned at the final end of the specific (Continued)

period, among a plurality of segment periods belonging to the specific period.

5 Claims, 14 Drawing Sheets

(56) References Cited

OTHER PUBLICATIONS

International Search Report issued in PCT/JP2015/070977; dated Sep. 29, 2015.
A "Decision to Grant a Patent" issued by the Japanese Patent Office dated Apr. 4, 2016, in connection with Japanese Patent Application No. 2014-153959.

* cited by examiner

| Segment period | S0 | S1 | S2 | S3 | S4 | S5 | Integral average value |
|---|---|---|---|---|---|---|---|
| Time length (s) | 0.00139 | 0.00139 | 0.00139 | 0.00139 | 0.00139 | 0.00139 | |
| Lamp current (A) | 3 | 1 | 1 | 1 | 1 | 1 | |
| Value of integral | 0.00417 | 0.00139 | 0.00139 | 0.00139 | 0.00139 | 0.00139 | 0.00185 |
| Rate of deviation | +125% | -25% | -25% | -25% | -25% | -25% | |

| Segment period | S0 | S1 | S2 | S3 | S4 | S5 | Integral average value |
|---|---|---|---|---|---|---|---|
| Time length (s) | 0.00139 | 0.00139 | 0.00139 | 0.00139 | 0.00139 | 0.00139 | |
| Lamp current (A) | 3 | 1 | 1 | 3 | 1 | 1 | |
| Value of integral | 0.00417 | 0.00139 | 0.00139 | 0.00417 | 0.00139 | 0.00139 | 0.00231 |
| Rate of deviation | +80% | -40% | -40% | +80% | -40% | -40% | |

| Segment period | S0 | S1 | S2 | S3 | S4 | S5 | Integral average value |
|---|---|---|---|---|---|---|---|
| Time length (s) | 0.00139 | 0.00139 | 0.00139 | 0.00139 | 0.00139 | 0.00139 | |
| Lamp current (A) | 3 | 3 | 3 | 1 | 1 | 3 | |
| Value of integral | 0.00417 | 0.00417 | 0.0417 | 0.00139 | 0.00139 | 0.00417 | 0.00324 |
| Rate of deviation | +29% | +29% | +29% | -57% | -57% | +29% | |

| Segment period | S0 | S1 | S2 | S3 | S4 | S5 | Integral average value |
|---|---|---|---|---|---|---|---|
| Time length (s) | 0.00107 | 0.00321 | 0.0032 | 0.00107 | 0.00160 | 0.00107 | |
| Lamp current (A) | 3 | 1 | 2 | 1 | 1 | 1 | |
| Value of integral | 0.00321 | 0.00321 | 0.00064 | 0.00107 | 0.00160 | 0.00107 | 0.00180 |
| Rate of deviation | +78% | +78% | -64% | -41% | -11% | -41% | |

DISCHARGE LAMP LIGHTING DEVICE, LIGHT SOURCE DEVICE, AND IMAGE FORMATION DEVICE

TECHNICAL FIELD

The present invention relates to a lighting device of a discharge lamp which is preferably used for a light source such as a projector. The present invention also relates to a discharge lamp lighted up by the lighting device and to an image formation device having the discharge lamp.

BACKGROUND ART

A discharge lamp having a high mercury vapor pressure is used for a light source of a projector device. In such a high-voltage mercury lamp, the light in a visible wavelength region can be obtained with a high output by making the mercury vapor pressure high.

The discharge lamp has a light emitting part which is formed by a discharge vessel and has a substantially spherical shape. A pair of electrodes is arranged in the light emitting part so as to be opposite to each other with an extremely small distance, for example, 2 mm or less.

In the case that the discharge lamp described above is lighted in the same state for a long period, a plurality of minute protrusions may be formed or minute irregularities may be generated in the tip surface of the electrodes due to a high temperature. The minute protrusions and the irregularities are generated by the melting of a material (for example, tungsten) constituting the electrodes and the aggregation of a chemical compound generated by being bonded to gas which is sealed within the light emitting part, and this existence changes the shape of the tip surface of the electrodes. It has been known that a starting point of an arc moves in conjunction with this, the discharge position becomes unstable, and there has been a problem that a flickering of a projection light called as a flicker is generated.

In order to solve such problems, Patent Document 1 discloses a technique for inputting into a lamp an alternating current in which an amount of input current is increased at a predetermined timing. FIG. 13 is a view showing an example of the conventional lamp current waveform. A current pulse P shown in FIG. 13 is structured so as to include a pulse P1 which is input to the discharge lamp at a normal time, and a pulse P2 in which the amount of the input current is increased at a predetermined timing, compared to the pulse P1.

Since the pulse P2 is intermittently inserted, a degree of heat applied to the electrode is enhanced at this timing, and it is possible to transmit the heat not only to an electrode tip but also to a position distant from the tip. Therefore, the heat is transmitted to the position which is distant from the electrode tip during this time, and it is possible to melt and evaporate minute protrusions and irregularities which are generated at the position. As a result, it is possible to eliminate the protrusions and irregularities at the other positions than the electrode tip which may affect adversely, and it is possible to stabilize a luminescent spot of the arc.

PRIOR ART DOCUMENT

Patent Document

Patent Document 1: JP-A-10-501919

SUMMARY OF THE INVENTION

Problems to be Solved by the Invention

Since the pulse P2 is higher in its peak value than the pulse P1, an amount of current input to the discharge lamp comes up at a timing that the pulse P2 is input, and a brightness is instantaneously increased at this timing. However, since an insertion interval of the pulse P2 is normally about several tens Hz to several hundreds Hz, blinking caused by this brightness change is not viewed.

Meanwhile, an image formation device such as a projector has a light modulation element such as a liquid crystal panel. Further, a drive signal for driving the liquid crystal panel is generated on the basis of an input video signal. The liquid crystal panel modulates the light from the discharge lamp by being driven on the basis of the drive signal. The respective colors of lights passing through the liquid crystal panel are combined and are projected to a screen via a projection optical system. The drive signal of the liquid crystal panel indicates a frequency in correspondence to the video signal, and is normally set to 60 Hz or 120 Hz.

As a result, in the case that a drive frequency of the liquid crystal panel and a frequency of the pulse P2 having the high peak value are asynchronous, a rolling bar and a striped noise appear in the projected image. This may lower an image quality.

In view of the above problems, an object of the present invention is to provide an illumination system of a discharge lamp which can suppress flickering of a projected image compared to the conventional one, in an image formation device such as a projector which employs the discharge lamp driven by alternating current. Further, another object of the present invention is to provide a light source device such as a discharge lamp which is lighted by such an illumination system, and an image formation device provided with the light source device.

Means for Solving the Problem

The present invention is a discharge lamp lighting device for supplying alternating current to a discharge lamp having a pair of electrodes arranged to be opposite to each other within a discharge vessel in which a predetermined gas is sealed, the discharge lamp lighting device having:

a power supply control part to which a video synchronized signal is input from an external portion; and a power supply part which converts supplied DC voltage into the alternating current based on a control signal output from the power supply control part, and supplies the alternating current to the discharge lamp, wherein the power supply control part includes:

a segment signal generation part which generates a segment signal indicating a plurality of segment periods obtained by dividing a specific period indicated by the video synchronized signal;

a peak value control part which generates a first control signal in correspondence to a peak value of the alternating current for every segment period, and outputs the first control signal to the power supply part; and a frequency control part which generates a second control signal indicating a timing for reversing a polarity of the alternating current based on the segment signal, and outputs the second control signal to the power supply part, and the peak value control part sets a specific segment period, which indicates a value where a value of integral corresponding to a product of a length of the segment period and the peak value set in the segment period is most deviated from an average value of values of integral within the specific period, to another segment period than a final segment period positioned at a final end of the specific period, among the plurality of segment periods belonging to the specific period.

As described in the section of "PROBLEMS TO BE SOLVED BY THE INVENTION", the timing for changing the amount of current input to the lamp is not conventionally synchronized with the video synchronized signal for driving the liquid crystal panel, and accordingly the image quality is adversely affected. In view of this point, it can be considered that the image quality deterioration such as rolling bar and striped noise can be prevented by synchronizing the timing for changing the amount of current with the video synchronized signal.

In the structure mentioned above, it is possible to divide the time period (corresponding to "specific period" mentioned above), which is defined between the first time that the level of the video synchronized signal is changed and the second time that the level of the video synchronized signal is next changed, into a plurality of segment periods, and to change the amount of current input to the discharge lamp in segment period unit. As a result, it is possible to synchronize the timing that the amount of current fluctuates with the timing of the video synchronized signal.

Meanwhile, the video signal is generally transmitted to the image formation device such as a projector every specific unit (normally one frame). Further, a video synchronized signal indicating a switching timing for the unit is transmitted to the lighting device. However, in some cases, the length of the video signal may be varied. If any dispersion is generated in the length of the frame (the length of the specific period) as mentioned above, a blinking may be generated in the video projected between the frames in some aspects of the change of the input current amount.

According to the structure of the present invention, a value of integral corresponds to a product of the length of each segment obtained by dividing the specific period into a plurality of sections, and a peak value set in the segment period (corresponding to the amount of the current input to the lamp). This value of integral sets a specific segment period indicating a value which is the farthest from an average value of the values of integral in the specific period to the other period than the final segment period. As a result, it is possible to suppress the generation of rolling bar and striped noise mentioned above while suppressing the blinking between the frames. This will be described later in the section of "MODE FOR CARRYING OUT THE INVENTION".

Meanwhile, not only for the purpose of stabilizing the luminescent spot of the arc in the discharge lamp, but also for the other purposes such as 3D drive, there is a case that the discharge lamp is lighted while the amount of the current input to the lamp is finely changed. With the structure of the present invention, in the case that the discharge lamp is lighted while the amount of the input current is changed as mentioned above, the image quality of the projected image can be improved.

The peak value control part may arrange the segment period indicating the value of integral which is the closest to the average value, in the final segment period.

The segment signal generation part may generate the segment signal by multiplying the video synchronized signal.

A light source device of the present invention has the discharge lamp lighting device, and a discharge lamp which lights up by current supply from the discharge lamp lighting device.

An image formation device of the present invention has:
the light source device;
a light modulation element which generates image information by modulating emitted light from the discharge lamp based on a video signal input from an external portion; and
a projection optical system which projects a light emitted from the light modulation element.

Effect of the Invention

According to the present invention, it is possible to considerably suppress the flickering of the image which is projected to the projection surface by using the light from the discharge lamp, compared to the conventional method.

MODE FOR CARRYING OUT THE INVENTION

[Image Formation Device]

Prior to a structure of a lighting device, a description will be given of a structure of an image formation device in which a lighting device according to the present invention is expected to be used, with reference to the accompanying drawings.

Figure 1:
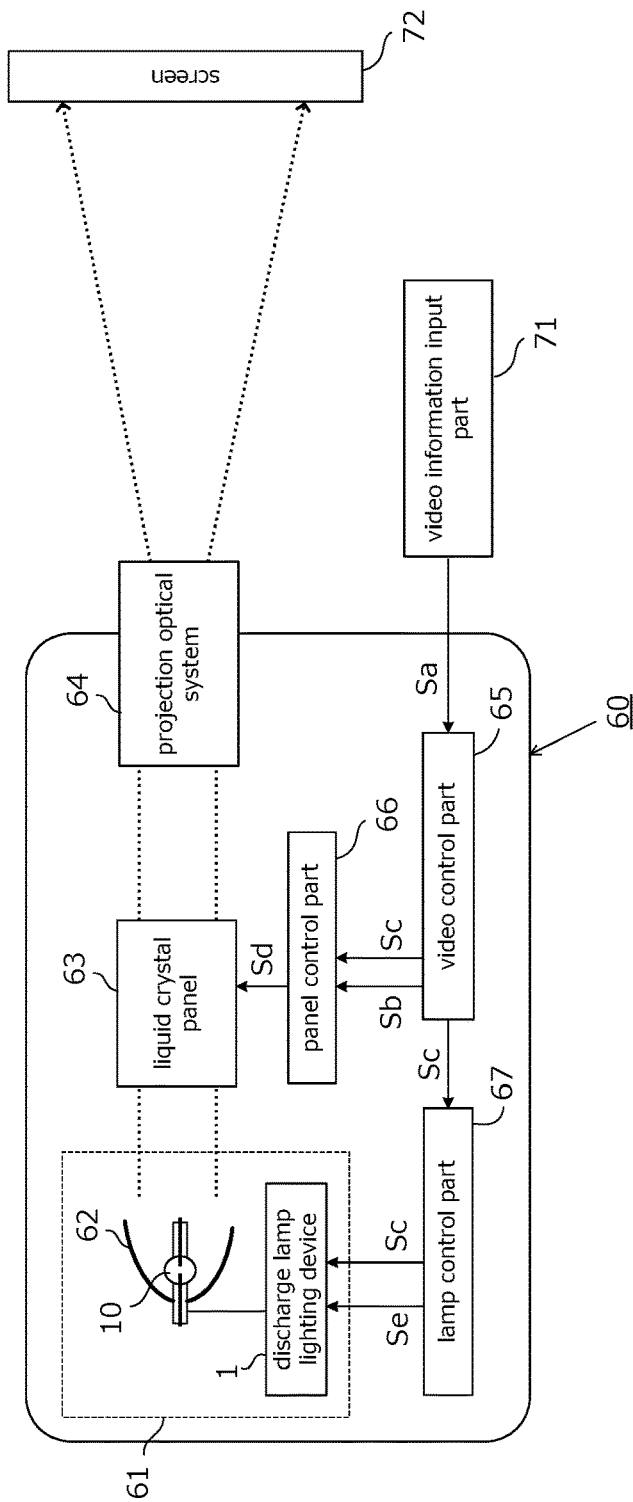
FIG. 1 is a block diagram schematically showing a structure of an image formation device of a type utilizing a liquid crystal panel.

FIG. 1 is a block diagram schematically showing an example of the structure of the image formation device of a type utilizing a liquid crystal panel as a light modulation element. Here, a liquid crystal projection is assumed as an image formation device 60. The image formation device 60 is provided with a light source device 61, a liquid crystal panel 63, a projection optical system 64, a video control part 65, a panel control part 66, and a lamp control part 67.

The light source device 61 is provided with a discharge lamp lighting device 1, a discharge lamp 10, and a recessed reflecting mirror 62. The discharge lamp 10 is a lamp of an alternating current lighting type, and is arranged so that an arc luminescent spot of the lamp and a first focal point of the recessed reflecting mirror 62 approximately coincide with each other. The lighting control for the discharge lamp 10 is executed by the discharge lamp lighting device 1. The structure of the discharge lamp 10 and the discharge lamp lighting device 1 will be described later.

The light reflected from the recessed reflecting mirror 62 is irradiated onto the liquid crystal panel 63. In the present embodiment, the liquid crystal panel 63 is a transmission type liquid crystal panel, and is utilized as a light modulation element (a light valve) which modulates the irradiated light according to a drive signal from the panel control part 66. The light radiated from the light source device 61 passes through the liquid crystal panel 63, whereby the image is formed, and the image light is projected onto a screen 72 via the projection optical system 64.

To the video control part 65, a video signal Sa is input from a video information input part 71 which is constructed by PC or DVD. The video control part 65 converts the video signal Sa into a processable data format, and applies an image processing such as brightness adjustment, contrast adjustment, sharpness adjustment and trapezoidal distortion correction. Further, the video control part 65 carries out a frame rate conversion processing in relation to the video data in such a manner as to synchronize with a drive frequency of the liquid crystal panel 63, and outputs such data to the panel control part 66. More specifically, the video control part 65 outputs a video data signal Sb after processing and a video synchronized signal Sc to the panel control part 66.

The panel control part 66 generates a drive signal Sd for driving the liquid crystal panel 63 on the basis of the video data signal Sb and the video synchronized signal Sc which are generated by the video control part 65, and controls the liquid crystal panel 63.

The lamp control part 67 accepts an input of the video synchronized signal Sc from the video control part 65 and outputs the synchronized signal to the lighting device 1. Further, the lamp control part 67 outputs a set power signal Se at a time of adjusting a power consumption of the discharge lamp 10 to the discharge lamp lighting device 1. The set power signal Se is a signal which is used for changing a level of the set power signal Se and controlling to detect the level of the set power signal Se at the lighting device 1 side and lower the output, for example, at a time of controlling to drive while lowering the power consumption of the light source device 61. The video synchronized signal Sc may be structured so as to be output directly to the lighting device 1 from the video control part 65.

The lighting device 1 controls the current input to the discharge lamp 10 as mentioned later on the basis of the input video synchronized signal Sc and set power signal Se.

Although an illustration is omitted in FIG. 1, the image formation device 60 is provided with three liquid crystal panels 63 corresponding to three colors R, G and B, and the video control part 65 and the panel control part 66 have a function of processing image data for three colors. Further, the light source device 61 is provided with an optical system which separates white light into three colors of lights, and the projection optical system 64 is provided with a synthetic optical system which combines three colors of image lights and generates an image light indicating a color image.

[Structure of Lamp]

Figure 2A:
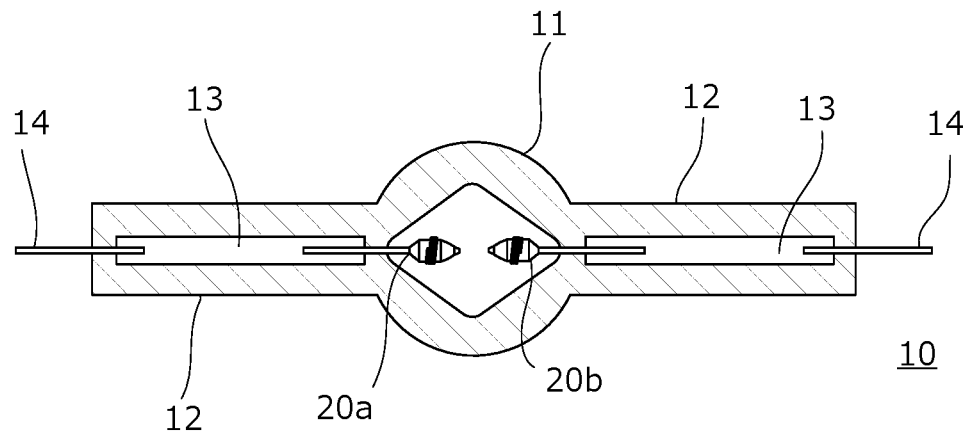
FIG. 2A is a cross-sectional schematic view of a discharge lamp.
Figure 2B:
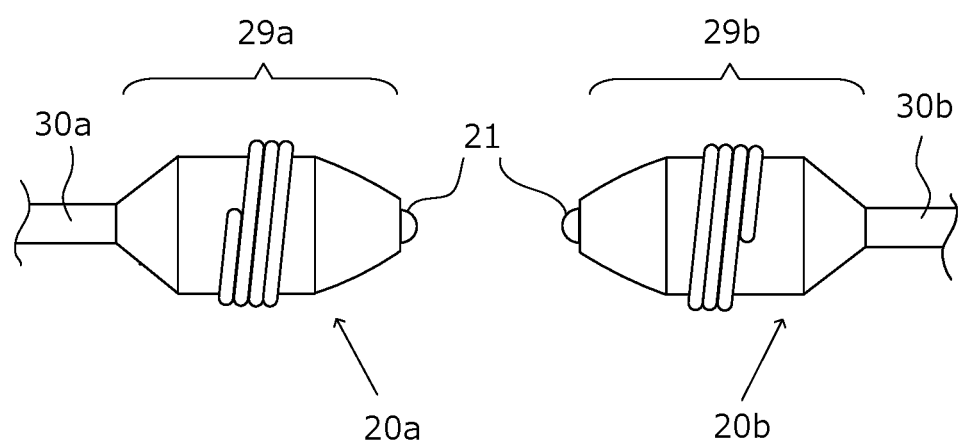
FIG. 2B is a cross-sectional schematic view in which the vicinity of an electrode tip of the discharge lamp is enlarged.

Next, a description will be given of a structure of discharge lamp 10. Schematic views of a cross section of the discharge lamp are shown in FIGS. 2A and 2B. FIG. 2B is a schematic view of the cross section obtained by enlarging a leading end of an electrode in FIG. 2A.

A discharge lamp 10 has an approximately spherical light emitting part 11 which is formed by a discharge vessel made of quartz glass. The material of the discharge vessel is not limited to the quartz glass, but the discharge vessel may include the other materials.

A pair of electrodes 20a and 20b is arranged in the light emitting part 11 so as to face each other at an extremely small distance, for example, 2 mm or less.

Further, sealing parts 12 are formed in both end portions of the light emitting part 11. A conducting metal foil 13 including molybdenum is buried in an airtight manner in the sealing part 12, for example, by a shrink seal. Shaft parts of electrodes 20a and 20b are bonded to one ends of the metal foils 13, outer leads 14 are bonded to the other ends of the metal foils 13, and electric power is supplied from the discharge lamp lighting device according to the present invention mentioned later.

Mercury, noble gas and halogen gas are encapsulated in the light emitting part 11 of the discharge lamp 10.

The mercury is provided for obtaining radiated light with a necessary visible wavelength, for example, a wavelength between 360 and 780 nm, and is encapsulated at 0.20 mg/mm$^3$, concretely. The encapsulating amount is differentiated by a temperature condition, and realizes high vapor pressure such as 200 atmospheres or higher as pressure in an inner section of the light emitting part at the lighting time. Further, it is possible to produce a discharge lamp having high mercury vapor pressure of 250 atmospheres or higher or 300 atmospheres or higher at the lighting time, by encapsulating the mercury more. As the mercury vapor pressure increases, the light source more suitable for the projector can be achieved.

For example, argon gas is encapsulated as the noble gas at about 13 kPa. A function thereof is to improve a starting performance for lighting.

Further, iodine, bromine or chlorine is encapsulated as halogen gas in a chemical compound mode with the mercury or the other metals. An encapsulating amount of the halogen is selected from a range between $10^{-6}$ μmol/mm$^3$ and $10^{-2}$ μmol/mm$^3$. The greatest reason for encapsulating the halogen is to make a service life of the discharge lamp utilizing a so-called halogen cycle longer. Further, in the case where the discharge lamp 10 is made extremely compact and is set to an extremely high lighting vapor pressure, it is also possible to obtain an action of preventing devitrification of the discharge vessel by encapsulating the halogen. The devitrification means that the crystallization makes progress from a metastable glass state and changes to an aggregation of the crystal grain which is grown from a lot of crystal nucleuses. If such phenomenon is generated, the light is scattered by the crystal grain boundary and the discharge vessel becomes opaque.

As long as the same function can be realized, the gas encapsulated in the light emitting part 11 is not limited to the gas mentioned above.

As one example, the discharge lamp 10 may be structured such that the maximum outer diameter of the light emitting part is 9.4 mm, a distance between the electrodes is 1.0 mm, the discharge vessel internal volume is 55 mm$^3$, the rated voltage is 70 V, the rated power is 180 W, and the electric power is supplied with an AC system.

Further, on the assumption that the discharge lamp 10 is used by being embedded in the projection which has been made progress of being made compact in recent years, the discharge lamp 10 is required to be extremely downsized in its whole dimension, and a higher amount of light emission is required on the other hand. As a result, the thermal influence within the light emitting part is extremely severe, and a tube wall load value of the lamp is between 0.8 and 2.5 W/mm$^2$, specifically 2.4 W/mm$^2$. As mentioned above, in the case where the discharge lamp 10 having the higher mercury vapor pressure and tube wall load value is mounted to equipment for presentation such as a projector or an overhead projector, the radiated light having good color rendering properties can be provided for the equipment for presentation.

As shown in FIG. 2B, the electrode 20a includes a head part 29a and a shaft part 30a, and the electrode 20b includes a head part 29b and a shaft part 30b. Further, a protrusion 21 is formed in a leading end of each of the electrode 20a and the electrode 20b. The protrusion 21 is formed by aggregation of an electrode material which is fused in the leading end of the electrode at the lamp lighting time. In the present embodiment, a description will be given on the assumption that both of the electrode 20a and the electrode 20b include tungsten; however, the material is not limited to this.

When the electrode 20a and the electrode 20b are energized, they become incandescent to a high temperature, and the tungsten constituting them is sublimated. The sublimated tungsten is combined with the encapsulated halogen gas in an inner wall surface area of the light emitting part 11 which is a comparatively low temperature area, and halogenated tungsten is formed. Since the halogenated tungsten is comparatively higher in its vapor pressure, the halogenated tungsten is again moved near to the leading ends of the electrode 20a and the electrode 20b in a gas state. Further, when the halogenated tungsten is reheated at this position, the halogenated tungsten is separated into the halogen and the tungsten. Among them, the tungsten is returned to the leading ends of the electrode 20a and the electrode 20b so as to be aggregated, and the halogen is returned as the halogen gas within the light emitting part 11. This corresponds to "halogen cycle" mentioned above. The protrusion 21 is formed by attachment of the aggregated tungsten to the vicinity of the leading ends of the electrode 20a and the electrode 20b.

[Structure of Lighting Device]

Next, a description will be given of a structure of lighting device 1 which lights up discharge lamp 10 discussed above.

Figure 3:
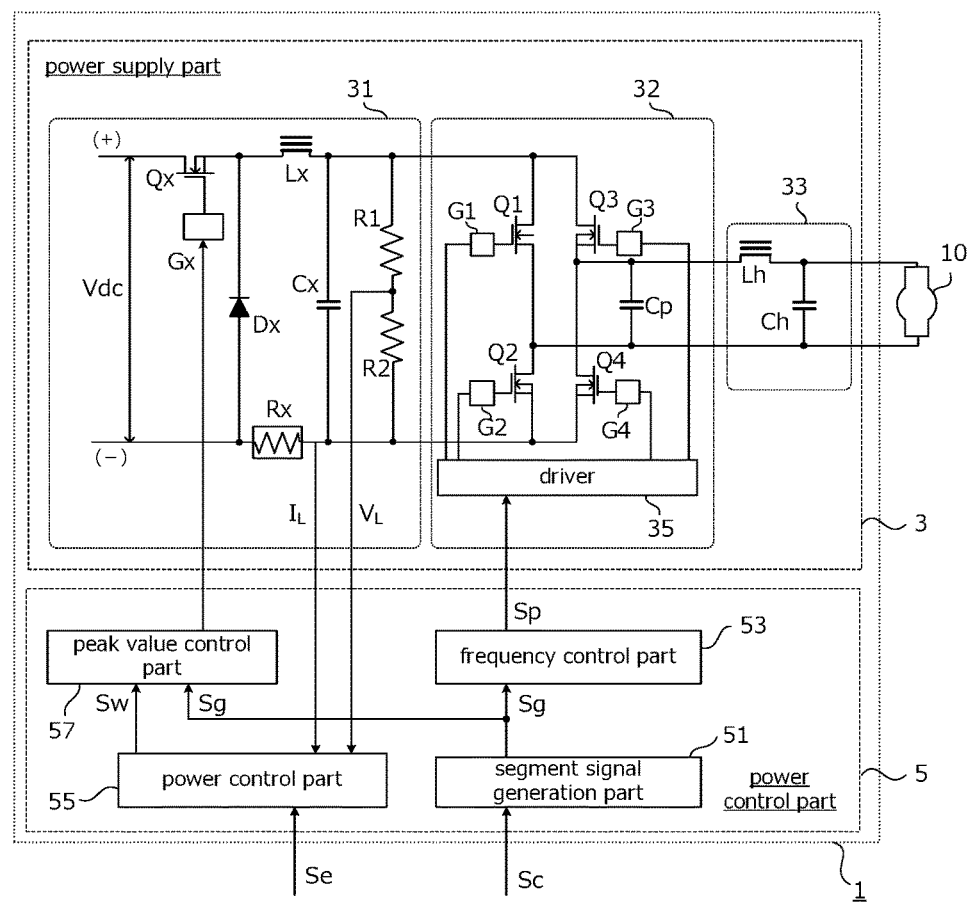
FIG. 3 is a circuit block diagram schematically showing a structure of a discharge lamp lighting device.

FIG. 3 is a circuit block diagram schematically showing a structure of the discharge lamp lighting device according to the present invention. As shown in FIG. 3, the lighting device 1 includes a power supply part 3 and a power control part 5.

<Power Supply Part 3>

The power supply part 3 is provided with a step-down chopper part 31, a DC/AC conversion part 32 and a starter part 33. This structure of the power supply part 3 is just an example.

The step-down chopper part 31 steps down a DC voltage Vdc to be supplied, to a desired DC voltage (DC applied voltage), and outputs the DC applied voltage to the DC/AC conversion part 32 in the subsequent stage. In FIG. 3, the step-down chopper part 31 is illustrated as a step-down chopper having a switching element Qx, a reactor Lx, a diode Dx, a smoothening capacitor Cx, a resistance Rx and a voltage dividing resistance (R1, R2), as a specific construction example.

The switching element Qx has one end connected to a positive side power terminal to which the DC voltage Vdc is supplied, and has the other end connected to one end of the reactor Lx. The diode Dx is structured such that a cathode terminal is connected to a connecting point of the switching element Qx and the reactor Lx, and an anode terminal is connected to a negative side power terminal. The smoothening capacitor Cx has one end (positive side terminal) connected to an output side terminal of the reactor Lx, and has the other end (negative side terminal) connected to an output side terminal of the resistance Rx. The resistance Rx is connected between the negative side terminal of the smoothening capacitor Cx and the anode terminal of the diode Dx, and realizes a function of detecting electric current. Further, the voltage dividing resistance Vx is connected between the negative side terminal and the positive side terminal of the smoothening capacitor Cx, and realizes a function of detecting electric voltage. Further, the voltage dividing resistances (R1, R2) are connected between a minus side terminal and a plus side terminal of the smoothening capacitor Cx and achieves a function of detecting the voltage.

The switching element Qx is driven by the gate signal Gx output from a power control part 5. On the basis of a duty of the gate signal Gx, the step-down chopper part 31 steps down the DC voltage Vdc to the voltage corresponding to the duty so as to output to the DC/AC conversion part 32 in the latter stage. That is, the applied voltage to the discharge lamp 10 is decided by the signal from the power control part 5.

The DC/AC conversion part 32 converts the input DC voltage to the AC voltage having a desired frequency, and outputs the AC voltage having a desired frequency to the starter part 33 in the subsequent stage. In FIG. 3, the DC/AC conversion part 32 including the switching elements Q1 to Q4 which are connected like a bridge is shown as a specific construction example (a full bridge circuit).

The switching element Q1 is driven by a gate signal G1 which is output from the driver 35. In the same manner, the switching element Q2 is driven by a gate signal G2, the switching element Q3 is driven by a gate signal G3, and the switching element Q4 is driven by a gate signal G4. The driver 35 outputs the gate signal to a group of the switching elements Q1 and Q4 arranged diagonally, and a group of the switching elements Q2 and Q3 so as to alternately repeat ON and OFF. As a result, the AC voltage having a rectangular waveform is generated between a connecting point of the switching elements Q1 and Q2, and a connecting point of the switching elements Q3 and Q4.

The starter part 33 is the circuit section for boosting the AC voltage supplied from the DC/AC part 32 at the discharge lamp starting time and supplying the boosted AC voltage to the discharge lamp 10. In FIG. 3, the starter part 33 including a coil Lh and a capacitor Ch is shown as a specific construction example. The high electric voltage necessary for starting the discharge lamp is created in a secondary side of the starter part 33 by applying the AC voltage having a high switching frequency (for example, several hundred kHz) near a resonance frequency of an LC series circuit including a coil Lh and a capacitor Ch from the DC/AC part 32 at the discharge lamp starting time, and is supplied to the discharge lamp 10. After the discharge lamp is lighted, a steady-state lighting motion is carried out by transferring the frequency of the AC voltage supplied from the DC/AC part 32 to a steady-state frequency (for example, 60 to 1000 Hz). The steady-state frequency corresponds to a frequency having a pulse P1 mentioned later.

In the circuit, the frequency change in the AC voltage to be supplied to the starter part 33 can be achieved by regulating a cycle of switching the On and OFF of the group of the switching elements Q1 and Q4 and the group of the switching elements Q2 and Q3 in the DC/AC part 32. As mentioned above, the on-off control of each of the switching elements (Q1, Q2, Q3 and Q4) is executed on the basis of the control signal from the driver 35. The driver 35 receives the signal output from the power supply control part 5, and, on the basis of this signal, outputs the control signal to each of the switching elements (Q1, Q2, Q3 and Q4).

Further, the change of the peak value of the AC voltage supplied to the starter part 33 can be achieved by regulating an operation duty of the switching element Qx in the step-down chopper part 31. More specifically, the switching element Qx of the step-down chopper part 31 is turned on and off with a switching frequency in correspondence to the duty of the gate signal Gx which the power supply control part 5 outputs, whereby the power supplied to the discharge lamp 10 changes. For example, in the case that the power supplied to the discharge lamp 10 is intended to be raised up, the power supply control part 5 controls to raise the duty of the gate signal Gx so as to be a desired power value.

<Power Supply Control Part 5>

In the present embodiment, the power supply control part 5 is provided with a segment signal generation part 51, a frequency control part 53, a power control part 55, and a peak value control part 57.

The segment signal generation part 51 generates a segment signal Sg on the basis of the video synchronized signal Sc which is input from the outside. In more detail, the segment signal generation part 51 measures a cycle of the video synchronized signal Sc and generates the segment signal Sg including information obtained by dividing with time period the cycle (corresponding to "specific period") into a plurality of sections at a predetermined rate. In the present embodiment, a description will be given of a case that the segment signal generation part 51 generates the segment signal Sg by dividing the cycle of the video synchronized signal Sc into a plurality of uniform periods.

Figure 4:
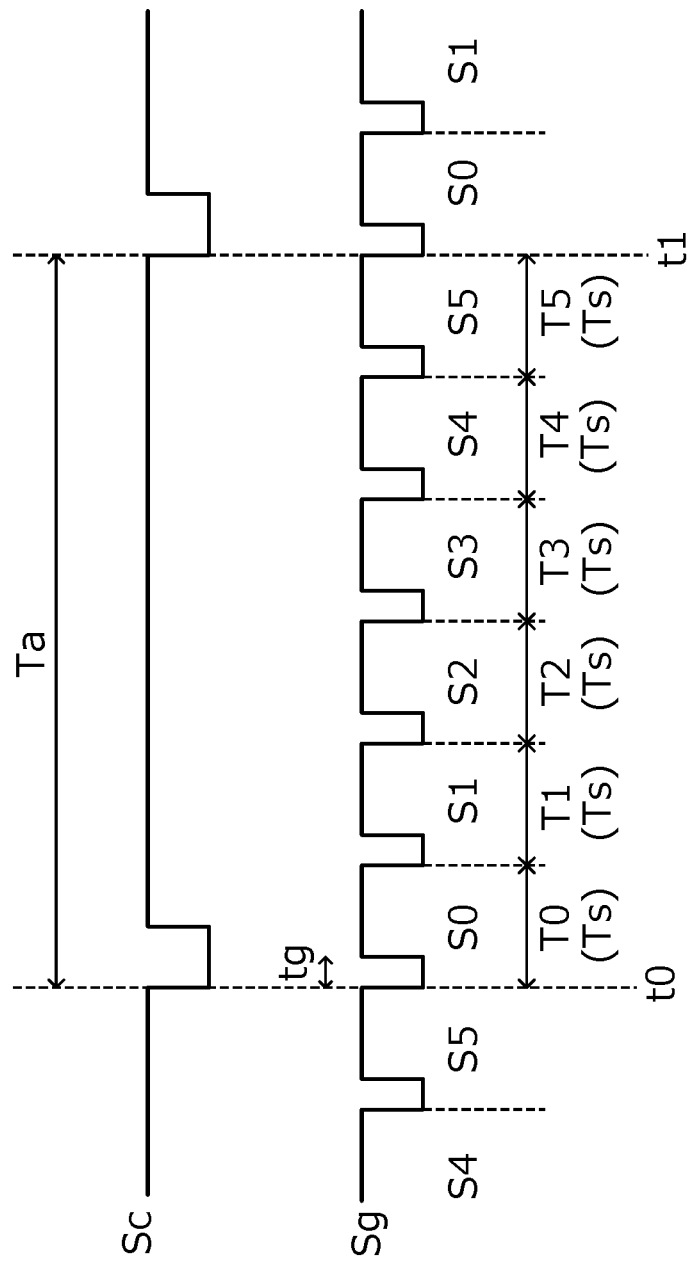
FIG. 4 is a time chart for comparing a video synchronized signal with a segment signal.

FIG. 4 is a time chart for comparing the video synchronized signal Sc with the segment signal Sg. Here, a description will be given by exemplifying a case that the segment signal generation part 51 divides a cycle Ta of the video synchronized signal Sc into six periods. When the segment signal generation part 51 detects falling of the video synchronized signal Sc at a time t0, the segment signal generation part 51 changes an output of the segment signal Sg at the timing (time period tg). Subsequently, after an elapse of a time period T0, the segment signal generation part 51 again changes the output of the segment signal Sg. Thereafter, the segment signal generation part 51 changes the output of the segment signal Sg every elapse of a time period T1, a time period T2, a time period T3, and a time period T4. Then, after an elapse of a time period T5, the segment signal generation part 51 again detects the falling of the video synchronized signal Sc. Thereafter, the operation is repeated.

According to the operation mentioned above, the segment signal generation part 51 generates the segment signal Sg indicating six times of output changes within one cycle of the video synchronized signal Sc. The segment signal Sg generates the segment period by an interval of two continuous output change timings. More specifically, in the present embodiment, one cycle Ta of the video synchronized signal Sc is divided into six segment periods S0 to S5 by the segment signal Sg which is generated by the segment signal generation part 51.

The cycle Ta of the video synchronized signal Sc normally depends on the frame rate. Thus, the length of the cycle Ta can be comprehended by the power supply control part 5 side. Accordingly, the segment signal generation part 51 can recognize a timing for changing the output of the segment signal Sg on the basis of the length of the cycle Ta. In the case of the present embodiment, since the lengths (T0 to T5) of the respective segment periods are set to the same length, the segment signal generation part 51 may change the output of the segment signal Sg every time that the time period obtained by dividing the length of the cycle Ta into six has passed.

As mentioned above, the video synchronized signal Sc is generated so as to synchronize with the drive frequency of the liquid crystal panel 63 on the basis of the video signal Sa which is input from the video information input part 71 in the video control part 65. As a result, the video synchronized signal Sc generally comes to a signal indicating a fixed cycle. However, in the case that any dispersion is generated in the length of the video signal Sa, any dispersion may be generated in the length of the video synchronized signal Sc due to the dispersion.

Figure 5:
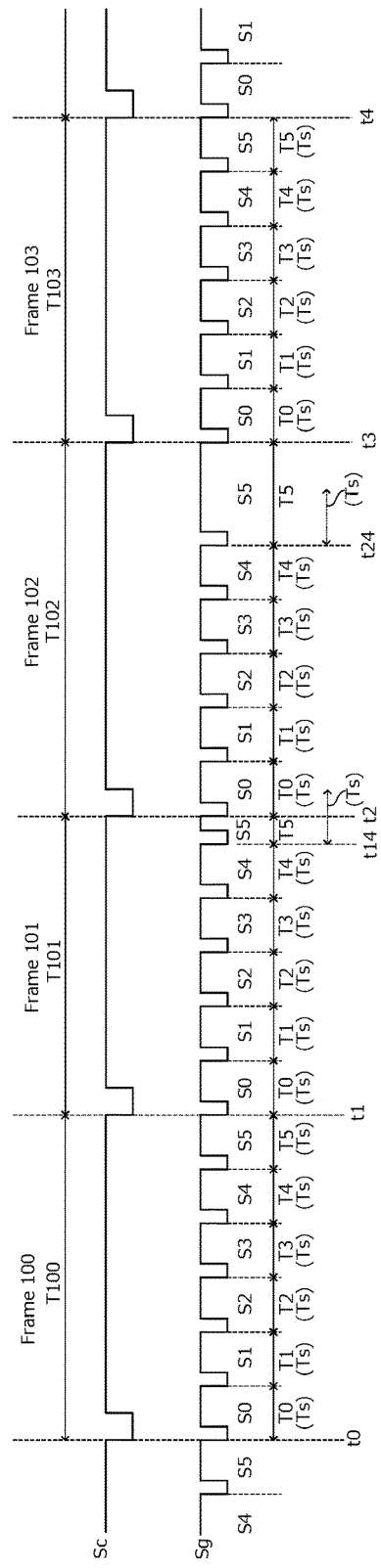
FIG. 5 is a time chart for comparing the video synchronized signal with the segment signal.

FIG. 5 is a time chart for comparing the video synchronized signal Sc with the segment signal Sg in the case that the dispersion is generated in the length of the video synchronized signal Sc. FIG. 5 shows a case where a frame 100 and a frame 103 are constructed by an appropriate time period, a frame 101 is constructed by a shorter time period than an appropriate state, and a frame 102 is constructed by a longer time period than the appropriate state.

The segment signal generation part 51 cannot recognize the timing that the frame is switched, until the segment signal generation part 51 detects the timing of the change in the video synchronized signal Sc. However, as mentioned above, the video synchronized signal Sc output from the video control part 65 is normally a signal indicating the predetermined cycle. Therefore, the segment signal generation part 51 generates the segment signal Sg so as to divide it into a plurality of segment periods at a predetermined rate, on the basis of the predetermined cycle (the appropriate frame period). Here, a description will be given on the assumption that the cycle Ta of the video synchronized signal Sc shown in FIG. 4 is the appropriate period.

In the present embodiment, in order to construct six segment periods (S0 to S5) by the uniform time period, the segment signal generation part 51 changes the output of the segment signal Sg just after detecting the video synchronized signal Sc, and thereafter changes the output of the signal every time that the time period (Ts) obtained by dividing the cycle Ta into six has passed. According to such a structure, each of the frame periods Ta is divided into the segment periods (S0 to S5) having the same time period Ts, as shown in FIG. 4, as long as the video synchronized signal Sc has the appropriate cycle.

However, if the output change of the segment signal Sg is carried out at a time t14 so as to indicate the start of the final segment period in the frame 101 in the case that the length of the video synchronized signal Sc is shorter than the appropriate state like the frame 101 shown in FIG. 5, the output change of the video synchronized signal Sc indicating the start of the next frame 102 is detected before the time period Ts does not pass from the time t14 (time t2). Therefore, if the segment signal generation part 51 changes the output of the segment signal Sg at a timing that the time period Ts has passed from the time t14, synchronization between the segment signal Sg and the video synchronized signal Sc cannot be secured.

Further, if the output change of the segment signal Sg is carried out at a time t24 so as to indicate the start of the final segment period in the frame 102 in the case that the length of the video synchronized signal Sc is longer than the appropriate state like the frame 102 shown in FIG. 5, the output change of the video synchronized signal Sc indicating the start of the next frame 103 is not detected even after the time period obtained by dividing the cycle Ta into six has passed from the time t14. Therefore, if the segment signal generation part 51 changes the output of the segment signal Sg at a timing that the time period Ts has passed from the time t24, synchronization between the segment signal Sg and the video synchronized signal Sc cannot be secured.

In order to avoid such situation, when the segment signal generation part 51 generates the segment signal Sg for dividing the frame period (100, 102, 102, 103, . . . ) into a plurality of segment periods, the segment signal generation part 51 does not change the output of the segment signal Sg until detecting the output change of the video synchronized signal Sc after changing the output for indicating a start timing of the segment period (corresponding to "final segment period") S5 which is positioned at the last of the frame period.

More specifically, in the frame 101, the segment signal generation part 51 changes the level of the segment signal Sg when detecting the output change of the video synchronized signal Sc indicating the start of the next frame 102 even before the elapse of the time period Ts from the time t14. In the same manner, in the frame 102, the segment signal generation part 51 does not change the level of the video synchronized signal Sc at a time point of the elapse of the time period Ts from the time t24, but changes the level of the segment signal Sg at a time point of subsequent detection of the output change in the video synchronized signal Sc indicating the start of the next frame 103.

According to the structure mentioned above, the segment signal generation part 51 can generate the segment signal Sg which is synchronized with the video synchronized signal Sc even in the case that any dispersion is generated in the frame period defined by the video synchronized signal Sc. However, according to this structure, the dispersion is generated in the length of the segment period (the final segment period) positioned just before the frame is switched, among a plurality of segment periods generated by dividing each of the frame periods in connection with the dispersion of the frame period. In the example of FIG. 5, the segment period S5 corresponds to the final segment period. Since the length T5 of the final segment period S5 belonging to the frame 100 and the frame 103 is formed under the appropriate frame period Ta, it is equal to the predetermined time period. On the contrary, the length of the final segment period S5 belonging to the frame 101 is shorter than the appropriate length, and the length of the final segment period S5 belonging to the frame 102 is longer than the appropriate length.

The segment signal Sg generated by the segment signal generation part 51 is output to the frequency control part 53 and the peak value control part 57. The frequency control part 53 generates a polarity signal Sp in which its polarity is reversed with a frequency defined in advance on the basis of the segment signal Sg, and outputs it to the driver 35. For example, in the case of supplying an alternating current in which its polarity is reversed according to the cycle of the segment signal Sg to the discharge lamp 10, the frequency control part 53 generates the polarity signal Sp in which its polarity is reversed at a timing that the output of the segment signal Sg fluctuates and outputs it to the driver 35. The driver 35 outputs gate signals (G1, G2, G3 and G4) to the switching elements (Q1, Q2, Q3 and Q4) on the basis of the polarity signal Sp. As a result, the alternating current having a rectangular wave in which the polarity is reversed with the frequency according to the polarity signal Sp is supplied to the discharge lamp 10. The polarity signal Sp corresponds to "second control signal".

Figure 6A:
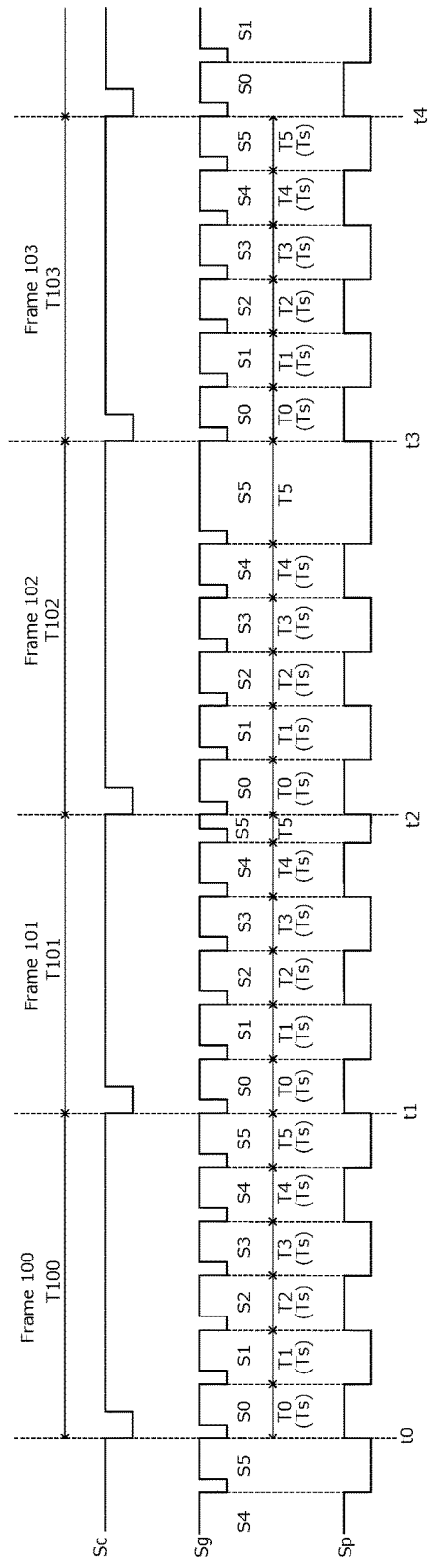
FIG. 6A is a time chart for comparing the video synchronized signal, the segment signal, and a polarity signal.
Figure 6B:
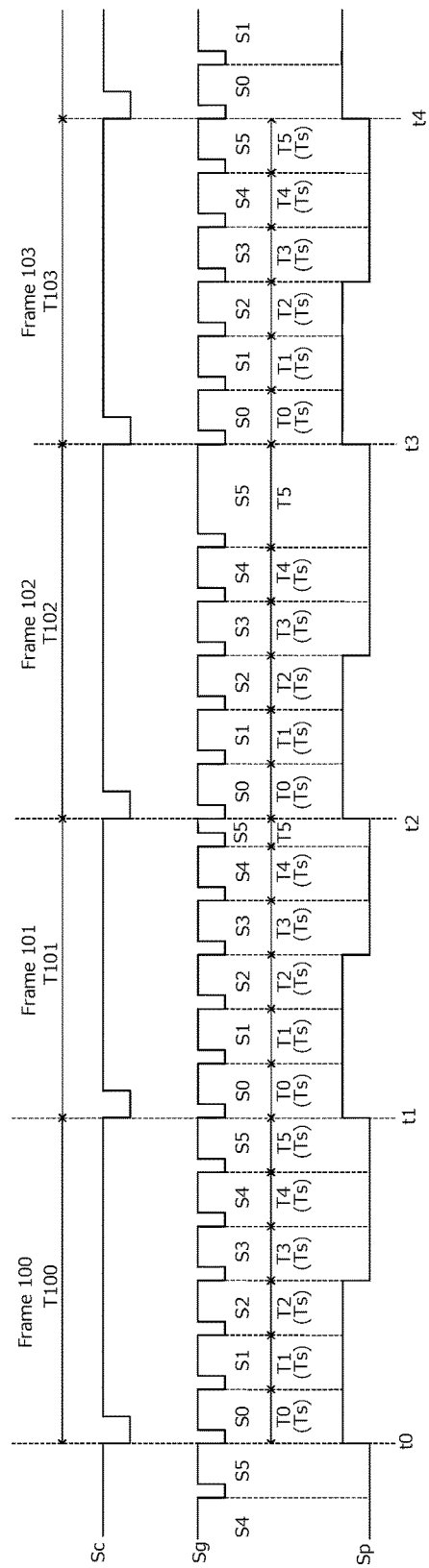
FIG. 6B is another time chart for comparing the video synchronized signal, the segment signal, and the polarity signal.

FIGS. 6A and 6B are time charts showing examples of the polarity signal Sp which is generated by the frequency control part 53 receiving the segment signal Sg shown in FIG. 5. In the example in FIG. 6A, the frequency control part 53 generates the polarity signal Sp in which the output is changed at each of timings that the output of the segment signal Sg changes. Further, in the example in FIG. 6B, the frequency control part 53 generates the polarity signal Sp in which the output is changed at a predetermined timing among the timings that the output of the segment signal Sg changes. As shown in FIGS. 6A and 6B, it is possible to change the frequency of the alternating current input to the discharge lamp 10, by differentiating the timing for changing the output of the polarity signal Sp. In FIG. 6B, the cycles are uniform in the respective polarities, but the cycles may be made different for every polarity.

More specifically, the frequency control part 53 can be structured such as to store the information relating to the polarity of the alternating current input to the discharge lamp 10 (whether the polarity is positive or negative) every segment period (the segment periods S0 to S5 in the example of FIG. 5), and change the output of the polarity signal Sp on the basis of the information.

A voltage signal $V_L$ which is detected by voltage dividing resistances (R1, R2) and a current signal $I_L$ which is detected by a resistance Rx are input to the power control part 55, and the power control part 55 calculates the power at the current time point. Further, the power control part 55 compares a power value (a target power value) which is indicated by the set power signal Se input from the outside with the calculated power value at the current time point, and outputs a peak value setting signal Sw in correspondence to a result of the comparison. The peak value control part 57 shows a duty ratio which is set on the basis of the peak value setting signal Sw input from the power control part 55, and generates a gate signal Gx which is synchronized with the segment signal Sg input from the segment signal generation part 51. The gate signal Gx corresponds to "first control signal".

The voltage signal $V_L$ corresponds to a voltage generated by dividing the DC voltage stepped down by the step-down chopper part 31 with the voltage dividing resistances (R1, R2), and is a voltage corresponding to the voltage applied to the discharge lamp 10. Further, the current signal $I_L$ is a current corresponding to the current which is input to the discharge lamp 10. Therefore, the power supply control part 5 has a function of feedback controlling so that the lighting power of the discharge lamp 10 is fixed, as long as the instruction of changing the power consumption of the discharge lamp 10 is not given from the outside, that is, as long as the value of the set power signal Se does not change.

The discharge lamp lighting device 1 according to the present embodiment controls to differentiate an absolute value (a peak value) of the alternating current which is input to the discharge lamp 10 at a predetermined timing. More specifically, the discharge lamp lighting device 1 aims at stabilizing the luminescent spot of the arc by raising the absolute value of the amount of current which is input to the discharge lamp 10 at a predetermined timing. Here, a description will be given of a case of controlling to increase an amount of input current in the first segment period S0 among the respective segment periods (S0 to S5) which are generated by dividing the respective frame periods (T100, T101, T102, T103, . . . ).

Figure 7:
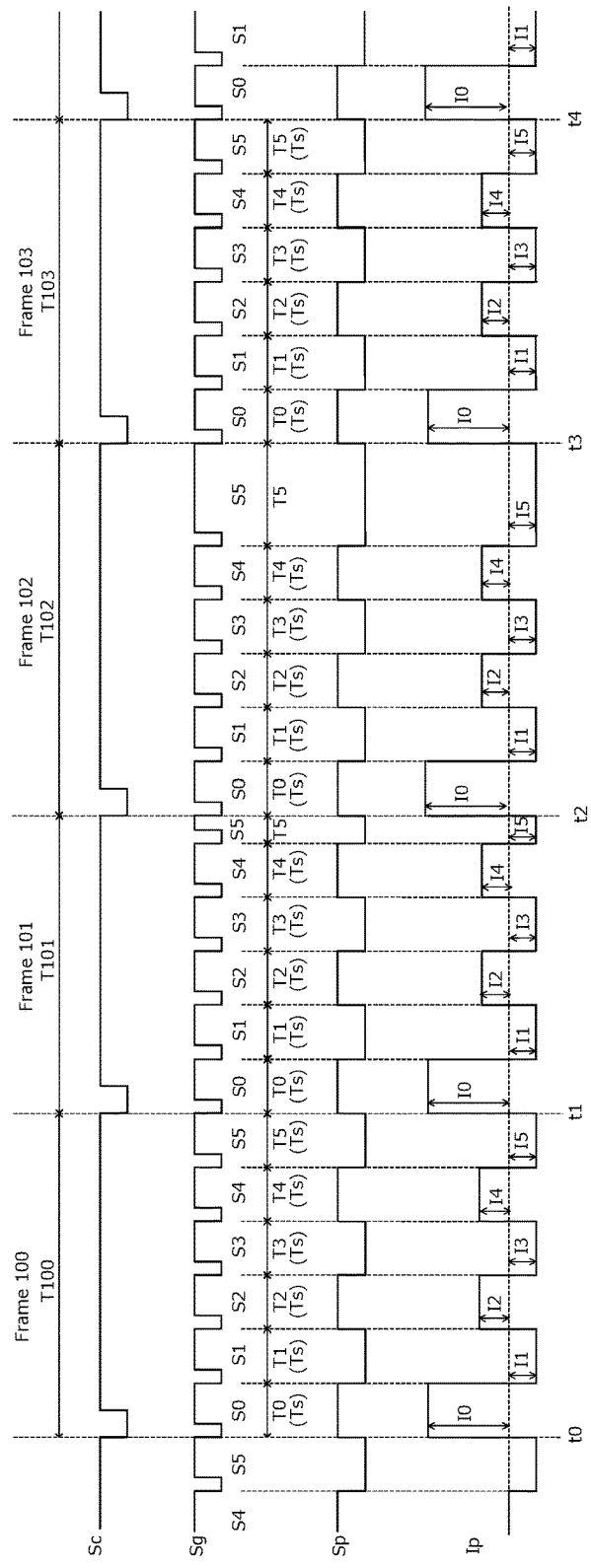
FIG. 7 is a time chart for comparing the video synchronized signal, the segment signal, the polarity signal, and a lamp current waveform.

The control mentioned above can be carried out, for example, according to the following methods. The peak value control part 57 stores in advance the information relating to the amount of the input current (for example, the information of the current ratio) in the respective segment periods (S0 to S5). Further, the peak value control part 57 detects arrival of each of the segment periods (S0 to S5) on the basis of the segment signal Sg which is supplied from the segment signal generation part 51, and generates the gate signal Gx in which the duty ratio is adjusted so as to come to the amount of current stored every segment period. As a result, an alternating current Ip shown in FIG. 7 is supplied to the discharge lamp 10, for example. FIG. 7 is a view obtained by adding a waveform of the lamp current Ip input to the discharge lamp 10 to the time chart in FIG. 6.

Figure 8:
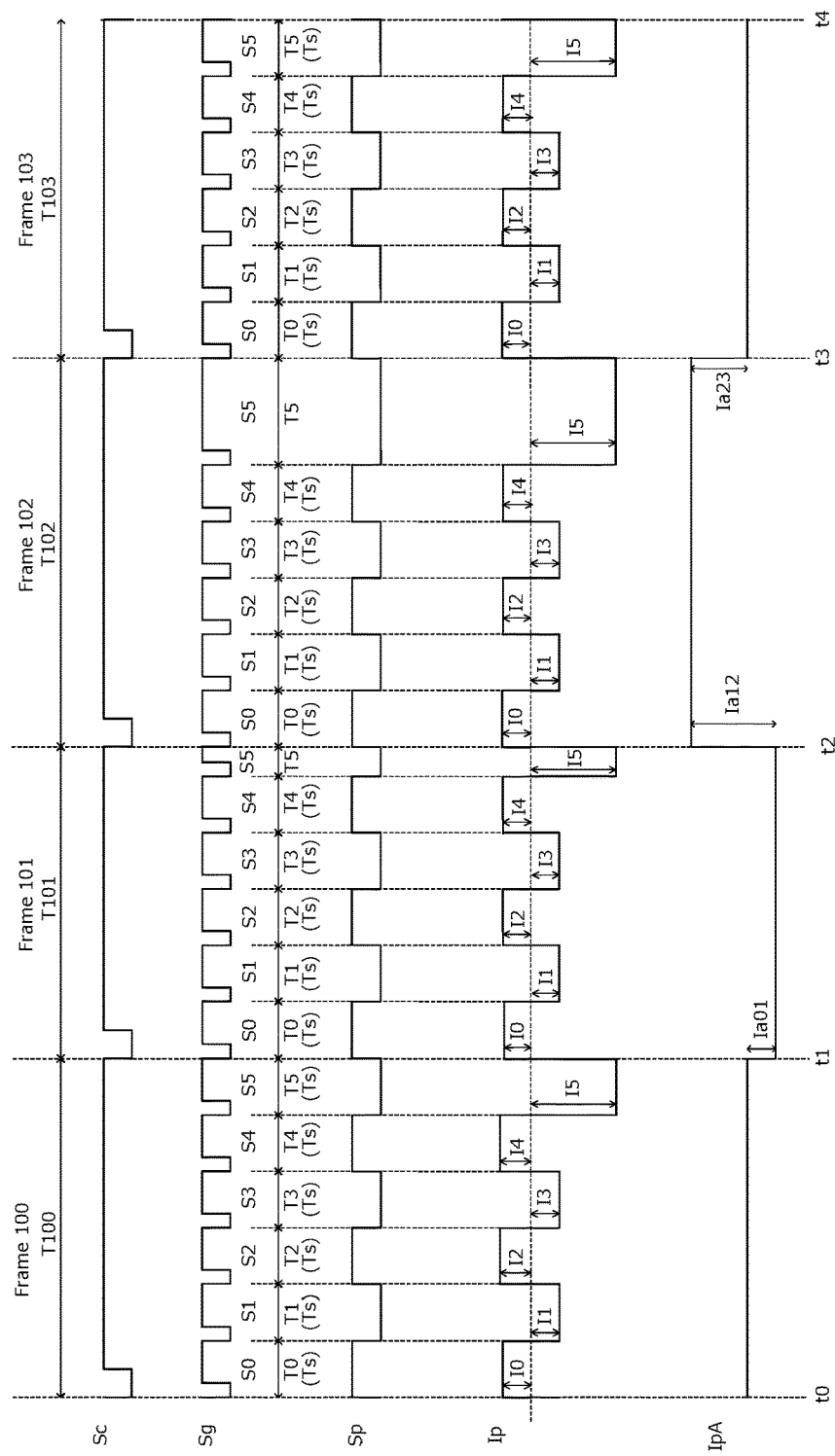
FIG. 8 is a time chart for comparing the video synchronized signal, the segment signal, the polarity signal, and the lamp current waveform in the case that a blinking is generated between frames.

Meanwhile, there is a case that the dispersion is generated in the length of the frame period due to the length of the video signal Sa as mentioned above. In the example of FIG. 7, the description is given by assuming the case that the peak value control part 57 generates the gate signal Gx so that the amount of input current becomes high in the period of the first segment period S0. Here, in the case that the peak value control part 57 generates the gate signal Gx so that the amount of input current becomes high in the final segment period S5 as shown in FIG. 8, the blinking may be generated between the frames. A description will be given of this point.

FIG. 8 shows a change of an average current IpA in each of the frames (100, 101, 102, 103) together with the waveform of the lamp current Ip. Here, "average current" means a time period average value of the absolute values of the amounts of input currents.

In the frame 101, the time period of the final segment period S5 is shorter than the frame 100. In the example of FIG. 8, the amount of input current is increased at the timing of the final segment period S5. As a result, the average value IpA of the input current in the frame 101 is lowered by Ia01 from the average value IpA of the input current in the frame 100. On the contrary, the time period of the final segment S5 is longer in the frame 102 than the frame 103, and accordingly, the average value IpA of the input current in the frame 102 comes up by Ia23 from the average value IpA of the input current in the frame 103.

Here, comparing the continuous frames 101 and 102, an extremely great difference is generated between the average value IpA of the input current in the frame 101 and the average value IpA of the input current in the frame 102. In the case that such situation is generated, the lightness of the video projected by the screen 72 changes within a visible range when changing from the frame 101 to the frame 102.

The situation mentioned above is generated because there is a case that the dispersion is generated in the length of the final segment period S5 due to the length of the video signal Sa. The final segment period S5 has a function of adjusting the length of each of the frame periods. Therefore, it is possible to make the difference between the frames in relation to the average values of the amounts of input current as small as possible by raising the amount of current which is input in the other segment periods than the final segment period S5 as shown in FIG. 7, thereby suppressing visibility of the blinking. In the example of FIG. 7, the amount of input current is raised in the segment period S0, but the effect of suppressing the blinking between the frames can be obtained by raising the amount of input current in any one period of the segment periods S0 to S4.

In the present embodiment, the description is given of the case that the amount of input current is changed only in one segment period under the condition that the lengths of the respective segment periods are set uniform. However, it is possible to employ an aspect that the amount of input current is changed in a plurality of segment periods. Further, the frame period (corresponding to "specific period" mentioned above) can be divided into a plurality of segment periods including segment periods having different lengths.

In view of such a case, the peak value control part 57 arranges a segment period (hereinafter, refer appropriately to as "specific segment period") that a value of integral corresponding to a product of the length of the segment period and the current value (the peak value) set in the segment period indicates a value which is farthest from an average value (hereinafter, refer appropriately to as "integral average value") of the value of integral within the frame period, in the other segment period than the final segment period, among a plurality of segment periods (S0 to S5). A description will be given of this content again with reference to the example of FIG. 7.

Figures 9A, 9B:
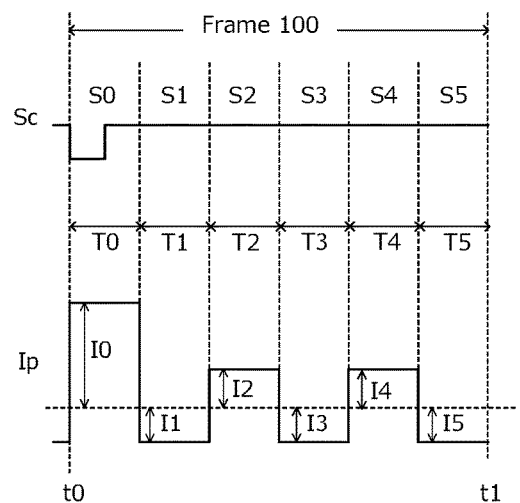
FIG. 9A shows an example of a time chart for comparing the video synchronized signal with the lamp current waveform.
FIG. 9B is a table indicating a rate of deviation from a value of integral and an integral average value in each of segment periods in a state of FIG. 9A.

FIG. 9A is a drawing obtained by extracting the waveforms of the video synchronized signal Sc and the lamp current Ip from the time chart in FIG. 7. The value of integral in the segment period Si is defined by a product of a length Ti of the segment period Si and a lamp current Ii input in the segment period. Further, an average value of the values of integral is defined by a value obtained by calculating Σ(Ti, Ii) in all the segment periods and dividing a result of the calculation by the frame period, that is, Σ(Ti). FIG. 9B is a table indicating the value of integral in each of the segment periods, and a calculated rate of deviation of the value of integral from the integral average value, in the case that the video synchronized signal Sc is set to 120 Hz, that is, the frame period is set to 0.0083 seconds, the amount of lamp current in the segment periods S1 to S5 is set to 1 (A), and the amount of lamp current in the segment period S0 is set to 3 (A), as an example.

According to the aspect in FIGS. 9A and 9B, the specific segment period where the value of integral is most deviated from the integral average value corresponds to the segment period S0, and this period does not correspond to the final segment period S5. Therefore, the peak value control part 57 generates the gate signal Gx which controls the duty ratio so as to form the lamp current Ip as shown in FIG. 9A, whereby it is possible to suppress the generation of the flicker in connection with the movement of the starting point in the arc, while suppressing the blinking between the frames.

In the above-mentioned example, the description is given of the case of temporarily raising the lamp current for the purpose of suppressing the movement of the arc starting point of the discharge lamp 10. However, the lighting device 1 according to the present invention is not limited to such a case, but can have the function of suppressing the blinking between the frames even in the case of generally changing the lamp current Ip at a predetermined timing. A description will be given below of the example.

Figures 10A, 10B:
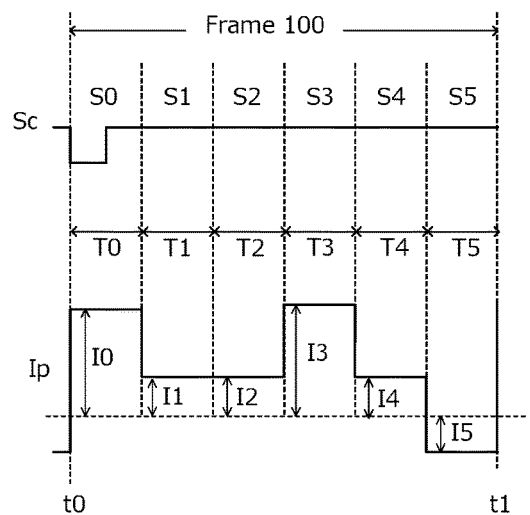
FIG. 10A shows an example of a time chart for comparing the video synchronized signal with the lamp current waveform.
FIG. 10B is a table indicating a rate of deviation from a value of integral and an integral average value in each of segment periods in a state of FIG. 10A.

FIG. 10A is a drawing obtained by extracting the waveforms of the video synchronized signal Sc and the lamp current Ip, in a different state from FIG. 9A. In the lamp current Ip in FIG. 10A, the period for which the alternating current input to the discharge lamp 10 indicates the same polarity is elongated in comparison with the lamp current Ip in FIG. 9A. It is possible to obtain an effect of suppressing the flicker in the case that the light modulation and the lamp voltage come up, by inputting the lamp current Ip to the discharge lamp 10.

In the lamp current Ip shown in FIG. 10A, a current absolute value becomes high in the segment period S0 and the segment period S3, and the current absolute value becomes low in the other segment periods (S1, S3, S4 and S5). FIG. 10B is a table indicating the value of integral in each of the segment periods (S0 to S5) and a calculated rate of deviation of the value of integral from the integral average value, in the case that the frame period is set to 0.0083 seconds in the same manner as FIG. 9B.

According to the aspects of FIGS. 10A and 10B, the specific segment period where the value of integral is most deviated from the integral average value corresponds to the segment periods S0 and S3, and this period does not correspond to the final segment period S5. As a result, it is possible to suppress the generation of the flicker in connection with the movement of the starting point of the arc while suppressing the blinking between the frames, by generating the gate signal Gx in which the duty ratio is controlled so as to form the lamp current Ip as shown in FIG. 10A, in the peak value control part 57.

Figures 11A, 11B:
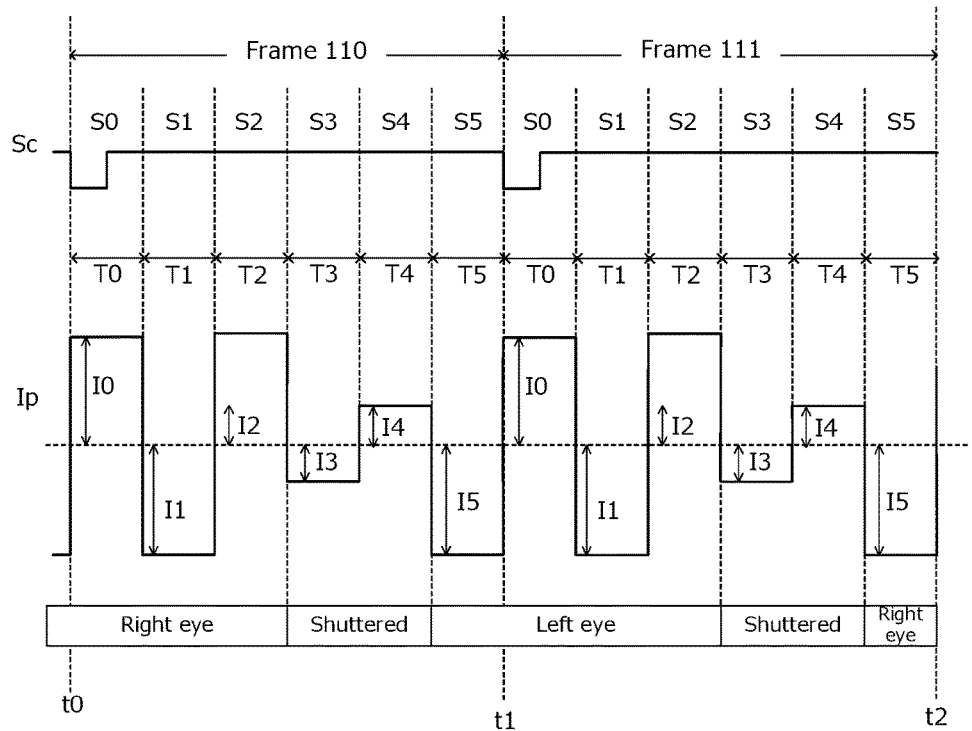
FIG. 11A shows an example of a time chart for comparing the video synchronized signal with the lamp current waveform.
FIG. 11B is a table indicating a rate of deviation from a value of integral and an integral average value in each of segment periods in a state of FIG. 11A.

FIG. 11A is a drawing obtained by extracting the waveforms of the video synchronized signal Sc and the lamp current Ip, in a different state from FIGS. 9A and 10A. The lamp current waveform in FIG. 11A corresponds to a case of three-dimensionally driving the image formation device 60. The image formation device 60 repeats processes for generating a video for a right eye, driving a shutter, generating a video for a left eye and driving the shutter, in the three-dimensional drive. The image formation device 60 raises the current absolute value input to the discharge lamp 10 at a timing of generating the video, and lowers the current absolute value input to the discharge lamp 10 at a timing of driving the shutter. It is possible to suppress generation of crosstalk which is a phenomenon particular to the three-dimensional video, by controlling the alternating current input to the discharge lamp 10 as mentioned above.

In the lamp current Ip in FIG. 11A, the current absolute value is high in the segment periods S0 to S2 and S5, and the current absolute value is low in the segment periods S3 to S4. FIG. 11B is a table indicating the value of integral in each of the segment periods (S0 to S5) and a calculated rate of deviation of each of the values of integral from the integral average value, in the case that the frame period is set to 0.0083 seconds in the same manner as FIG. 9B.

According to the aspects of FIGS. 11A and 11B, the specific segment period where the value of integral is most deviated from the integral average value corresponds to the segment periods S3 and S4, and this period does not correspond to the final segment period S5. As a result, it is possible to suppress the generation of the flicker in connection with the movement of the starting point of the arc while suppressing the blinking between the frames, by generating the gate signal Gx in which the duty ratio is controlled so as to form the lamp current Ip as shown in FIG. 11A, in the peak value control part 57.

Further, in the case that the lamp current Ip as shown in FIG. 11A is input to the discharge lamp 10, the right eye period and the left eye period stride over the frame. However, since the peak value control part 57 can make the amount of average input current between the frames small by controlling the peak value of the lamp current Ip as the present embodiment, it is possible to suppress the flickering between the right eye period and the left eye period.

Further, in the above-mentioned embodiment, the description is given of the case that the lengths of the segment periods S0 to S5 are uniform, but the length of at least one segment period among the segment periods S0 to S5 may be different. In this case, the segment signal generation part 51 generates the segment signal Sg indicating each of the segment periods S0 to S5 by dividing the frame period at a predetermined rate, as mentioned above.

Figures 12A, 12B:
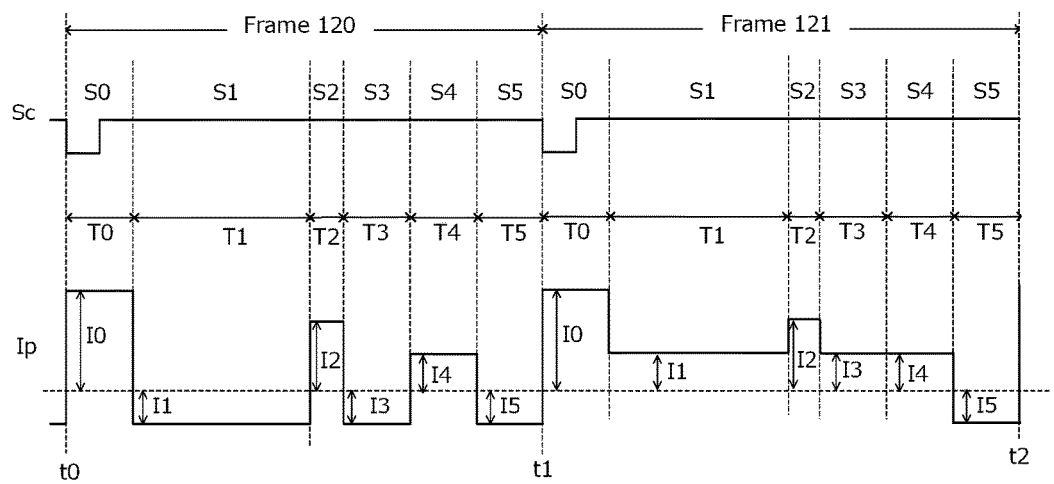
FIG. 12A shows an example of a time chart for comparing the video synchronized signal with the lamp current waveform.
FIG. 12B is a table indicating a rate of deviation from a value of integral and an integral average value in each of segment periods in a state of FIG. 12A.
Figure 13:
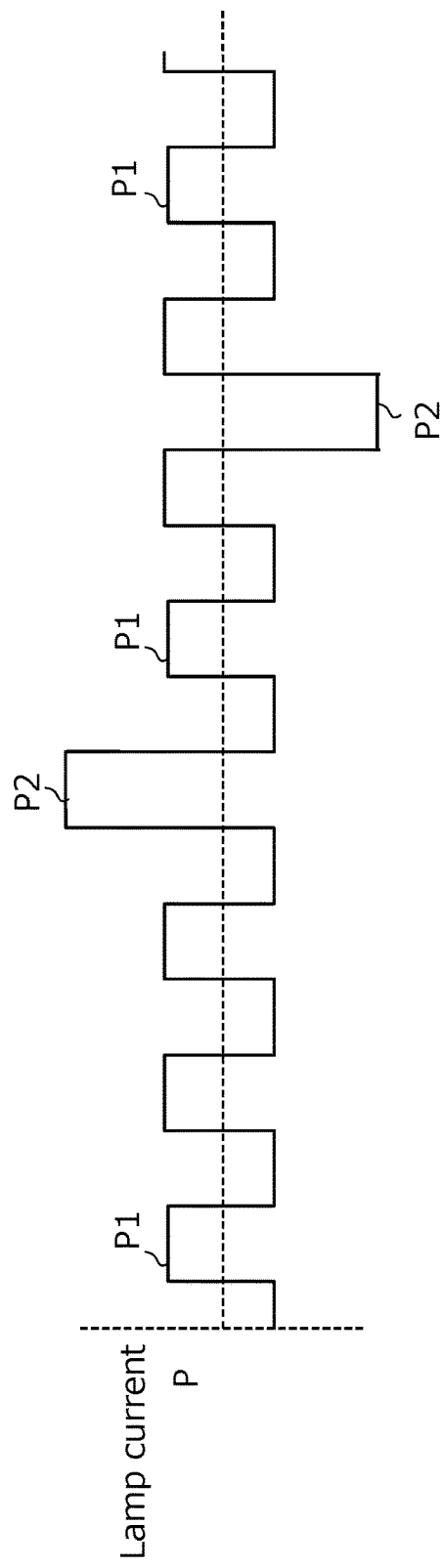
FIG. 13 is a view showing an example of a conventional lamp current waveform.

FIG. 12A is a drawing obtained by extracting the waveforms of the video synchronized signal Sc and the lamp current Ip, in a further different state from FIGS. 9A, 10A and 11A. The waveform shown in FIG. 12A indicates an aspect in which the current absolute values input to the discharge lamp 10 within the same segment period are equal, but the polarities are partly different, in the continuous frames 120 and 121. The frame 121 aims at achieving the effect of suppressing the flicker in the case that the light modulation and the lamp voltage come up, in the same manner as the lamp current Ip shown in FIG. 10A.

FIG. 12B is a table indicating the value of integral in each of the segment periods (S0 to S5) and a calculated rate of deviation of the value of integral from the integral average value, in the case that the frame period is set to 0.0083 seconds in the same manner as FIG. 9B.

According to the aspect of FIGS. 12A and 12B, the specific segment period where the value of integral is most deviated from the integral average value corresponds to the segment periods S0 and S1, and this period does not correspond to the final segment period S5. Therefore, it is possible to suppress the generation of the flicker in connection with the movement of the starting point of the arc while suppressing the blinking between the frames, by generating the gate signal Gx in which the duty ratio is controlled so as to form the lamp current Ip as shown in FIG. 12A, in the peak value control part 57.

In the current waveform shown in FIG. 12A, a frequency at which the frame having the high frequency of alternating current appears such as the frame 120 can be made extremely higher than a frequency at which the frame having the low frequency of alternating current appears such as the frame 121. It is possible to appropriately control the temperature of the electrode (20*a*, 20*b*) by adjusting the rate of the frame 120 and the frame 121, and it is possible to achieve a long service life of the discharge lamp 10.

Other Embodiments

A description will be given below of other embodiments.

<1> In the above-mentioned embodiment, the description is given on the assumption that the segment signal generation part 51 stores the lengths of the appropriate frame period ("specific period") and the rate of the lengths of the respective segment periods, and determines the timing for changing the output of the segment signal Sg on the basis of the information. However, the segment signal generation part 51 may be structured so as to detect the length of the proximate frame period or an average value of the lengths of the proximate several frame periods, and determine the timing for changing the output of the segment signal Sg on the basis of the detected length of the frame period.

In the case that the lengths of the respective segment periods are uniform in the above case, the segment signal Sg may be generated by simply multiplying the video synchronized signal Sc.

<2> In the above-mentioned embodiment, the description is given by exemplifying the case that the frame period is divided into six segment periods. However, the number of the segment periods is not limited to the example.

Further, as shown in FIG. 12A, the lighting control of the discharge lamp 10 may be carried out by combining a period (a high frequency period) where the lamp currents Ip having the reversed polarities are input in every segment period, and a period (a low frequency period) where the lamp current Ip indicating the same polarity is input over a plurality of segment periods. More specifically, the segment period is not necessarily the timing of the polarity reversion of the lamp current Ip which is input to the discharge lamp 10.

Here, for example, even in the case that the specific segment period is arranged in the final segment period only in the low frequency period, there is generated a concern that the blinking is viewed as a result of change in the lightness of the video projected onto the screen 72 in a cycle where the low frequency period appears. Therefore, in the case of having both the high frequency period and the low frequency period in relation to the lamp current input to the discharge lamp 10, the peak value control part 57 preferably controls the peak value in each of the segment periods so as to arrange the specific segment period in the period other than the final segment period, in relation to both the periods.

<3> In the above-mentioned embodiment, the description is given of the image formation device which uses the liquid crystal panel 63 as the light modulation element, but the present invention may be applied to a system which utilizes a digital mirror device (DMD).

DESCRIPTION OF REFERENCE SIGNS

1: discharge lamp lighting device
3: power supply part
5: power control part
10: discharge lamp
11: light emitting part
12: sealing part
13: conducting metal foil
14: outer lead
20*a*, 20*b*: electrode(s)
21: protrusion
29*a*, 29*b*: head part(s)
30*a*, 30*b*: shaft part(s)
31: step-down chopper part
32: DC/AC conversion part
33: starter part
35: driver
51: segment signal generation part
53: frequency control part
55: power control part
57: peak value control part
60: image formation device
61: light source device
62: recessed reflected mirror
63: liquid crystal panel
64: projection optical system
65: video control part
66: panel control part
67: lamp control part
71: video information input part
72: screen
Sa: video signal
Sb: video data signal
Sc: video synchronized signal
Sd: drive signal
Se: set power signal

The invention claimed is:

1. A discharge lamp lighting device for supplying alternating current to a discharge lamp having a pair of electrodes arranged to be opposite to each other within a discharge vessel in which a predetermined gas is sealed, the discharge lamp lighting device comprising:

a power supply control part to which a video synchronized signal is input from an external portion; and a power supply part which converts supplied DC voltage into the alternating current based on a control signal output from the power supply control part, and supplies the alternating current to the discharge lamp, wherein the power supply control part includes:

a segment signal generation part which generates a segment signal indicating a plurality of segment periods obtained by dividing a specific period indicated by the video synchronized signal;

a peak value control part which generates a first control signal in correspondence to a peak value of the alternating current for every segment period, and outputs the first control signal to the power supply part; and a frequency control part which generates a second control signal indicating a timing for reversing a polarity of the alternating current based on the segment signal, and outputs the second control signal to the power supply part, the specific period has the plurality of segment periods indicating different values of integral corresponding to a product of a length of the segment period and the peak value set in the segment period, and the peak value control part sets a specific segment period, which indicates the value of integral is most deviated from an average value of values of integral within the specific period, to another segment period than a final segment period positioned at a final end of the specific period, among the plurality of segment periods belonging to the specific period.

2. The discharge lamp lighting device according to claim 1, wherein the peak value control part arranges the segment period indicating the value of integral which is the closest to the average value, in the final segment period.

3. The discharge lamp lighting device according to claim 1, wherein the segment signal generation part generates the segment signal by multiplying the video synchronized signal.

4. A light source device comprising:
a discharge lamp lighting device according to claim 1; and
a discharge lamp which lights up by current supply from the discharge lamp lighting device.

5. An image formation device comprising:
the light source device according to claim 4;
a light modulation element which generates image information by modulating emitted light from the discharge lamp based on a video signal input from an external portion; and
a projection optical system which projects a light emitted from the light modulation element.

* * * * *